US007082217B2

(12) United States Patent
Shimizu et al.

(10) Patent No.: US 7,082,217 B2
(45) Date of Patent: Jul. 25, 2006

(54) METHOD AND APPARATUS FOR IMAGE COMPRESSION IN BLOCK UNITS

(75) Inventors: Kazufumi Shimizu, Toshima-ku (JP); Tomoyuki Ono, Toshima-ku (JP)

(73) Assignee: Web Technology Corp., Tokyo (JP)

( * ) Notice: Subject to any disclaimer, the term of this patent is extended or adjusted under 35 U.S.C. 154(b) by 760 days.

(21) Appl. No.: 10/281,149

(22) Filed: Oct. 28, 2002

(65) Prior Publication Data

US 2004/0081356 A1 Apr. 29, 2004

(51) Int. Cl.
*G06K 9/00* (2006.01)
*G06K 9/36* (2006.01)

(52) U.S. Cl. ..................... 382/166; 382/232
(58) Field of Classification Search ............... 382/166, 382/232, 252, 253; 345/582
See application file for complete search history.

(56) References Cited

U.S. PATENT DOCUMENTS 5,956,431 A 9/1999 Iourcha et al.
6,940,511 B1 * 9/2005 Akenine-Moller et al. .. 382/232

* cited by examiner

*Primary Examiner*—Phuoc Tran
(74) *Attorney, Agent, or Firm*—Oliff & Berridge, PLC (57) ABSTRACT

The present invention relates to a method and apparatus for image compression in block units, and particularly to the image editor, color equalizer and error diffuser functions thereof. According to this image compression method, processing is done in blocks of 4×4 pixels. In each block, two representative colors and two interpolated colors that are gained by linear interpolation between the two representative colors, i.e., four colors in total, are used. One of these four colors is allotted to each pixel. The image editor function directly edits the reference relationship between the representative color and the color of the pixels. The color equalizer function performs encoding by taking differences in coloring between a TV and a PC monitor in consideration, thereby reproducing images similar to colors seen by the PC user on the TV of a game machine. The error diffuser function produces a pseudo realization of colors that do not correspond to the representative and interpolated colors by mixing different colors in pixel units.

15 Claims, 9 Drawing Sheets

METHOD AND APPARATUS FOR IMAGE COMPRESSION IN BLOCK UNITS

BACKGROUND OF THE INVENTION

1. Field of the Invention

The present invention relates to a method and apparatus for image compression in block units, particularly to the image editor, color equalizer and error diffuser functions thereof.

2. Description of the Related Art

One known method and apparatus for image compression in block units is disclosed in U.S. Pat. No. 5,956,431.

Normally, image data is called direct color, with each pixel holding color information. However, according to the above-referenced known image compression method, each pixel holds reference information relating to two representative colors and two interpolated colors (two bits each) instead of the color information. Processing is done in blocks of 4×4 pixels (hereinafter referred to as a "block"). This processing is characteristic in that only four colors are used in each block. These four colors are the two representative colors (16 bits) and the two colors gained through linear interpolation of these two representative colors. By allocating the color information in this way, the data volume can be reduced. Normally, information of 24 bits for 16 colors are required, but in this case, only 16-bit information for two colors are necessary. Each pixel holds only reference information showing which of the four colors should be used. The reference information is generated by an encoder during image compression.

SUMMARY OF THE INVENTION

The known image compression method described above is a very good method, and enables a large reduction of the data volume. According to this known image compression method, image data is first decomposed in blocks, and processing is done for each blocks. Two representative colors are decided for each block, and the reference information of each pixel is prepared. Details of this processing are disclosed in U.S. Pat. No. 5,956,431.

As the two representative colors and the reference information are generated by an encoder, these values cannot be set arbitrarily. However, there are cases where, after actually viewing the image displayed based on the image data after image compression, the user desires to correct or edit the image. In such case, conventionally, the original image data had to be corrected and compressed by the above-described known image compression method, and then the image data after image compression had to be decoded, the image displayed, and evaluated. This method requires much labor, and the correction does not always render the desired result. Therefore, it is desirable that the image data after image compression be directly editable.

The present invention aims at solving the above problem by providing a method and apparatus for image compression in block units that enables direct editing of image data after image compression.

The present invention is a method for generating an image that is encoded in block units from an original image, comprising an image decomposing step for dividing said original image in plural blocks containing plural pixels, respectively, a block encoding step for deciding at least two representative colors for each of said blocks and generating reference information of each pixel within said block, and an editing step for editing said representative color and/or said reference information of said block. The reference information is information designating either said representative color or one or plural interpolated colors calculated from said representative color as the color of said pixel.

DESCRIPTION OF THE PREFERRED EMBODIMENTS

Figure 1:
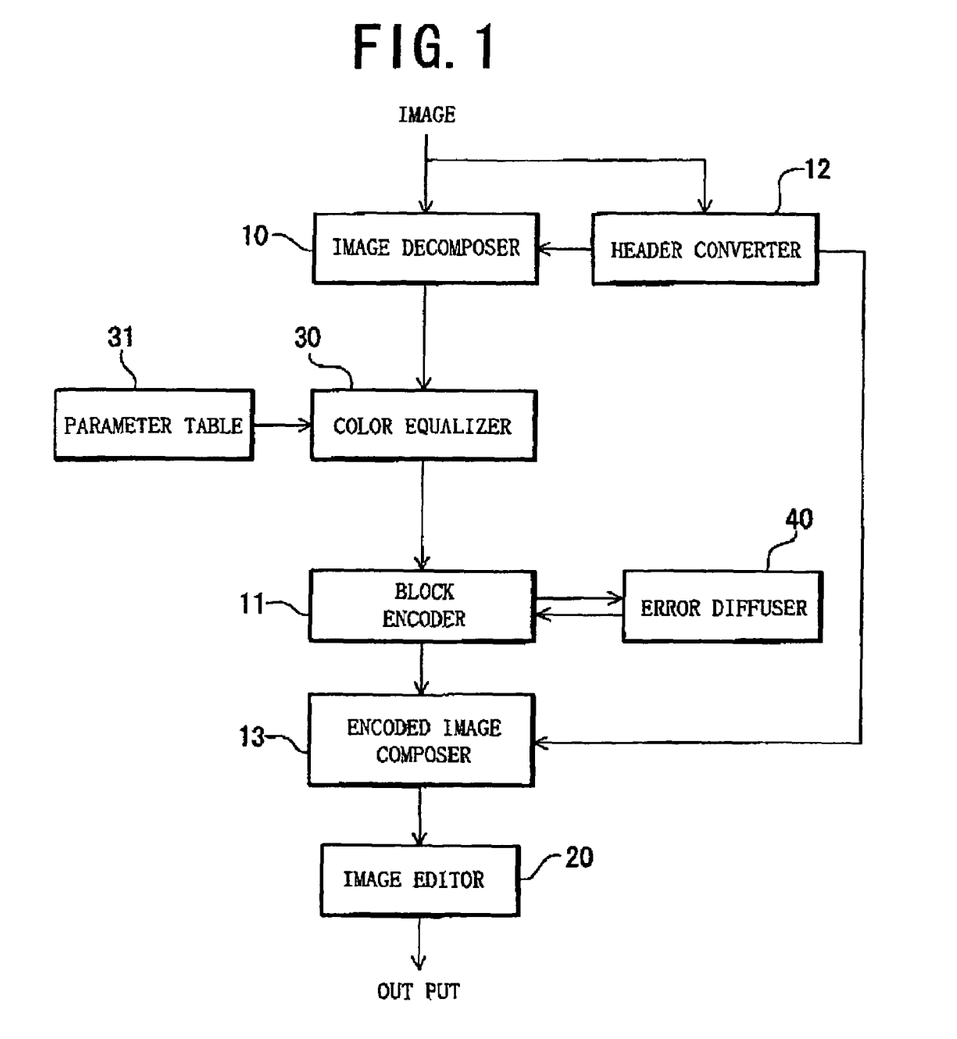
FIG. 1 is a block view of the apparatus according to an embodiment of the present invention.
Figure 2:
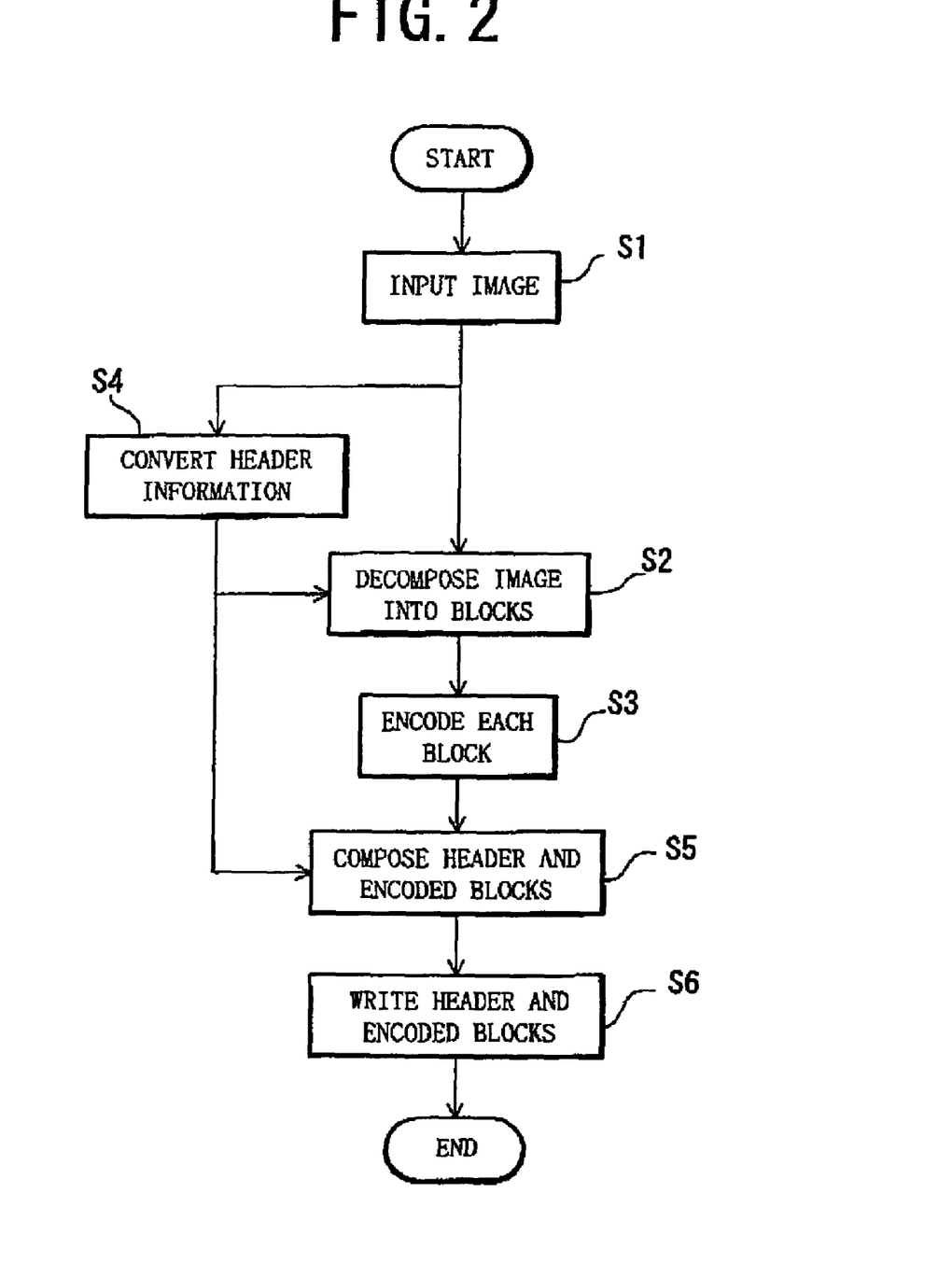
FIG. 2 is a flow chart describing the method according to an embodiment of the present invention.

FIG. 1 is a block view of the apparatus according to an embodiment of the present invention, and FIG. 2 is a flow chart describing the processing by such apparatus.

Figure 3A:
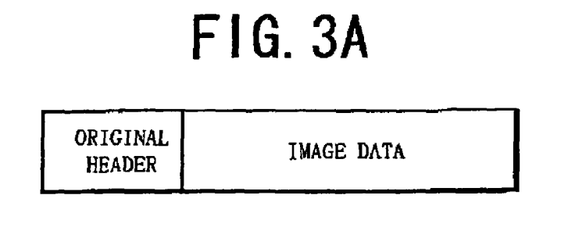
FIG. 3A is a view showing an example of the data format of the input image.

FIG. 3A shows a data format example of the input image. The input image is made of a header and image data. The header stores information such as the data size, number of bits of the pixel value, image size and the normal components of each color.

Upon receiving an image (S1), an image decomposer 10 decomposes the pixels contained in the image into predetermined units, e.g. blocks of 4×4 pixels (hereinafter referred to as a "block") (S2). The blocks gained through image decomposer 10 can be edited by color equalizer 30 and error diffuser 40.

Block encoder 11 encodes each decoded block (S3). Specifically, the two representative colors are decided and the reference information (two bits) for each pixel is prepared.

At the same time, header converter 12 converts the header information (S4). This is to gain a header that conforms to this image compression.

Encoded image composer 13 links the converted header to the encoded block (S5). The compressed image data is thus gained. Encoded image composer 13 outputs the data (S6). The compressed image data is decoded by a decoder corresponding to this image compression method, and then shown on the display. A description of the decoding processing will be omitted.

Figure 3B:
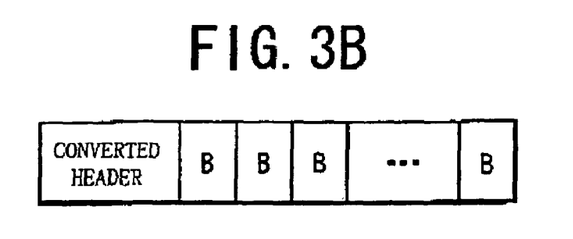
FIG. 3B is a view showing a format example of the compressed image data that is output by the encoded image composer according to an embodiment of the present invention.

FIG. 3B shows a format example of the compressed image data output by encoded image composer 13. The header converted by header converter 12 is added to the top of the frame, and encoded blocks B for each block follow.

Figure 3C:
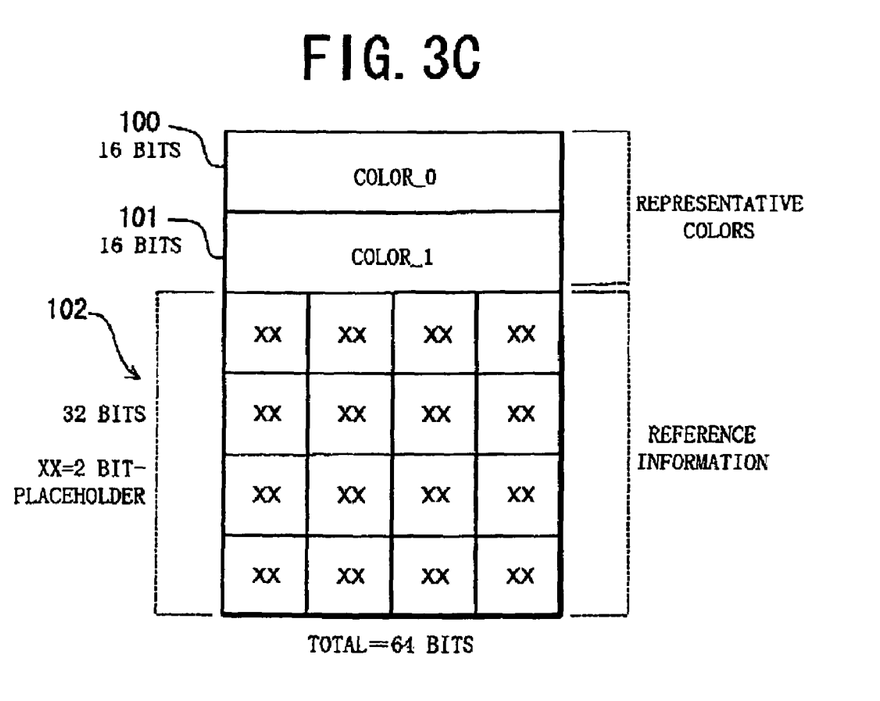
FIG. 3C is a view showing an example of the detailed structure of the encoded block according to an embodiment of the present invention.

FIG. 3C shows an example of the detailed structure of encoded block B. In this example, encoded block B relates to a block of 4×4 pixels. Numeral 100 denotes the portion (word) that stores the first representative color (color_0), and numeral 101 denotes the portion (word) that stores the second representative color (color_1). The two representative colors are the colors at the two ends of the block. For example, when the color data is of a format of 16 bit values with RGB 5:6:5 and the colors red (R) and black (B) exist within one block, color_0=red (R)=255 and color_1=black (B)=0. The two interpolated colors are calculated by linear interpolation between the two representative colors (accordingly, the data of the two interpolated colors are not stored in encoded block B). The representative and interpolated colors, four colors in total, are distributed evenly within the RGB color space.

Below is an example of the conversion formula for gaining the interpolated colors:

First interpolated color=⅔ color_0+⅓ color_1

Second interpolated color=⅓ color_0+⅔ color_1

Numeral 102 denotes the portion for storing the reference information of each pixel within the block. Each pixel has one of the two representative and two interpolated colors, so two bits are enough to designate the color. For example, if reference information=00, the first representative color is referenced, if reference information=01, the second representative color is referenced, if reference information=10, the first interpolated color is referenced, and if reference information=11, the second interpolated color is referenced. In FIG. 3C, the reference information portion is expressed by an image of a block of 4×4 pixels. For example, if the reference information of the pixel at the upper left end of the block refers to the first representative color, such pixel is expressed through the first representative color.

Example: pixel (0,0)→representative color 1
pixel (0,1)→interpolated color 2
pixel (0,2)→interpolated color 1
. . .
. . .
pixel (3,2)→representative color 2
pixel (3,3)→interpolated color 2

The compressed image data output by encoded image composer 13 is editable by editor 20. Editor 20 directly manipulates the data of encoded block B in FIGS. 3B and 3C, so it can be called an encoded block editor. Now, editor 20, color equalizer 30 and error diffuser 40 will be described below.

(1) Image Editing Processing

Image editing includes the processing of changing the representative color to a different color, and exchanging the color referenced by a pixel to a different color (representative color or interpolated color). This will be explained below.

Figure 4A:
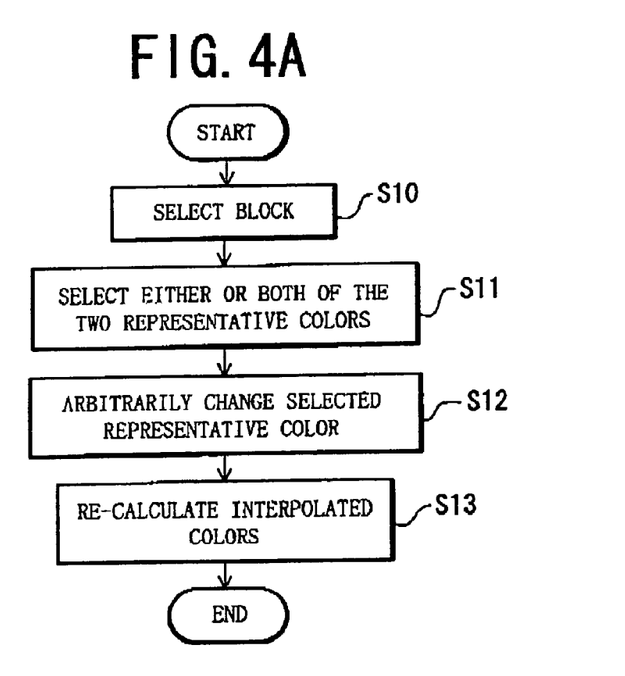
FIG. 4A is a flowchart showing the processing of changing the representative color of the encoded block according to an embodiment of the present invention to another color.

1-1) Processing of Changing the Representative Color to Another Color (Cf. FIG. 4A)

When encoding a block, the two representative colors are decided by the encoder. If one of the representative colors (either of the two colors) is changed after encoding, the two interpolated colors also change accordingly. Therefore, by changing one or both of the representative colors, it is possible to adjust colors after compression. This method directly adjusts the RGB values of the block.

Image editor 20 receives instructions from an operator, selects an arbitrary encoded block (S10), and selects either or both of the two representative colors of such encoded block (S11). Then, according to instructions from the operator, the selected representative color(s) is/are changed to an arbitrary color or colors (S12). The interpolated colors are automatically recalculated (S13). Recalculation may also be performed at the decoding processing.

When the representative and interpolated colors are changed, the colors of the pixels referencing them also change automatically. For example, when only the first representative color is changed from red to blue, the second representative color remains unchanged, but the two interpolated colors change and, as result, the colors of each pixel within the block change.

Figure 4B:
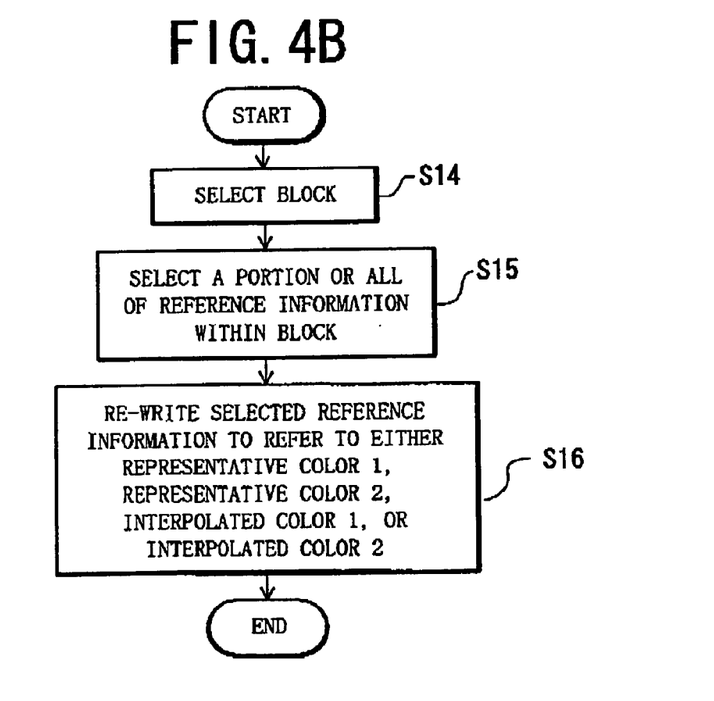
FIG. 4B is a flowchart showing the processing of changing the pixel reference relationship according to an embodiment of the present invention.

1-2) Processing of Changing the Reference Relationship of the Pixels (Cf. FIG. 4B)

When encoding a block, the reference relationship between each pixel and the two representative and two interpolated colors is automatically decided. When the reference relationship is changed after encoding, a portion or all of the colors of the pixels within the block change. Accordingly, it is possible to adjust colors after compression by changing the reference relationship.

Image editor 20 receives instructions from an operator, selects an arbitrary encoded block (S14), and selects the reference information of a portion or all of such encoded block (S15). Then, according to instructions from the operator, the image editor changes the selected reference information (S16).

For example, using the example described above, when the reference information of pixel (0,0) is changed from 00 to 11, it is possible to change the color referenced by pixel (0,0) from representative color 1 to interpolated color 2.

Figure 5:
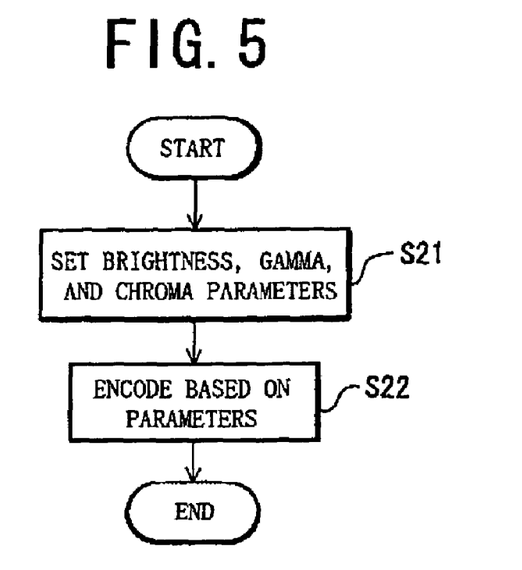
FIG. 5 is a flowchart showing the processing by the color equalizer according to an embodiment of the present invention.

(2) Color Equalizer Function (Cf. FIG. 5)

The display property (coloring) of a game machine display, i.e., a TV, differs largely from that of a personal computer monitor used for producing images. When the same image is displayed, that displayed on the TV tends to be somewhat loud in color. For example, there are cases where an image that had suitable brightness on the monitor of a personal computer had highlighted red color when displayed on the TV of a game machine. In this way, images prepared on a personal computer have different colors when displayed on a game machine, which makes work difficult for game designers. Color equalizer 30 functions to solve this problem. Color equalizer 30 references parameter table 31 to perform encoding by taking differences in coloring between a TV and a PC monitor in consideration. As result, it is possible to reproduce images on the game machine TV that have colors similar to those seen by the PC user.

The data contained in parameter table 31 includes the differences in display properties between a game machine TV and a PC monitor in advance. It is possible to adjust the parameters through operation by the operator. There are the following three types of parameters:

Brightness parameter: Brightness means how much light exists. The brightness is set to be somewhat suppressed.

Gamma parameter: Gamma is the value showing the degree of the gamma curve of televisions and photographs. The gamma parameter is set according to the gamma contrast properties of the game machine TV and the personal computer.

Chroma parameter: Chroma is a scale showing how vivid (or how much white is contained in a certain color) a color is. When the chroma is high, white is hardly contained, and when low, white is largely contained. The chroma parameter is set according to the chroma properties of the game machine TV and the PC monitor.

The hue does not have to be changed. There is no large difference between the hues of the TV and the PC monitor.

Color equalizer 30 receives instructions from the operator and converts the image data by referencing the parameters of parameter table 31 (S22). The parameters are set in advance (S21).

Figure 6:
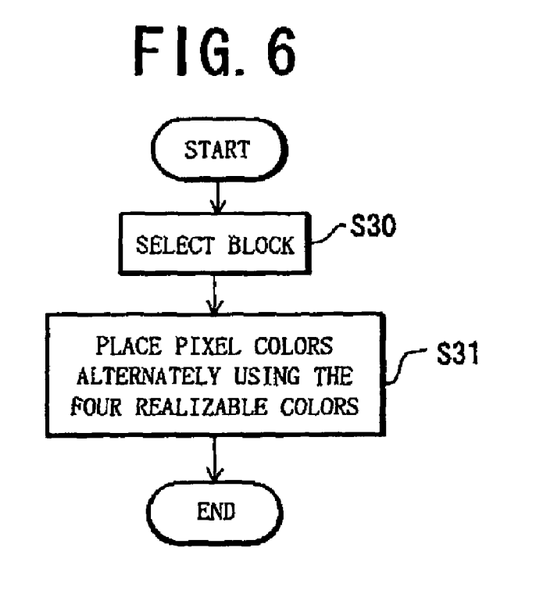
FIG. 6 is a flowchart showing the error diffusion processing according to an embodiment of the present invention.

(3) Error Diffusion During Encoding (Cf. FIG. 6)

In normal rendering, the representative and interpolated colors that are most similar to the pixels of the original image are selected. According to this method, colors that do not correspond to the representative and interpolated colors are not reproduced. By using the error diffusion method, it is possible to produce a pseudo realization of the colors that do not correspond to the representative and interpolated colors (colors that do not exist in the encoded block) by mixing different colors in pixel units during the rendering.

Furthermore, there are cases where the color after compression seems to be different from the original color. This is especially the case where there are gradations. Error diffusion is also effective in such case.

Figure 7A:
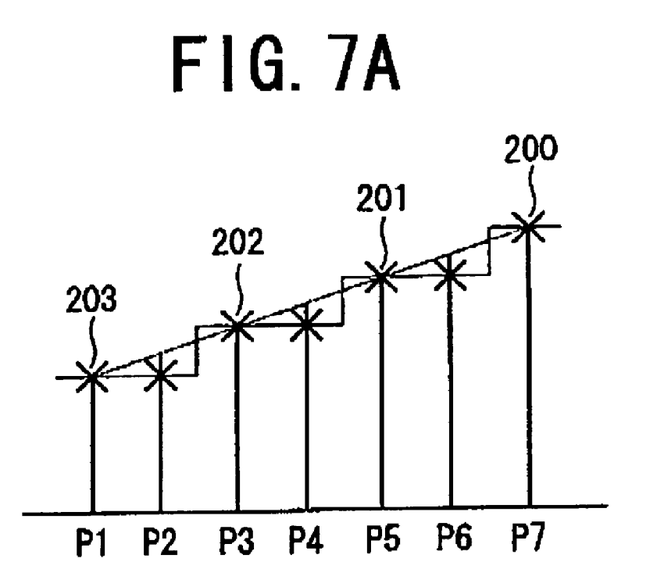
FIG. 7A is a model view showing the state before error diffusion.
Figure 7B:
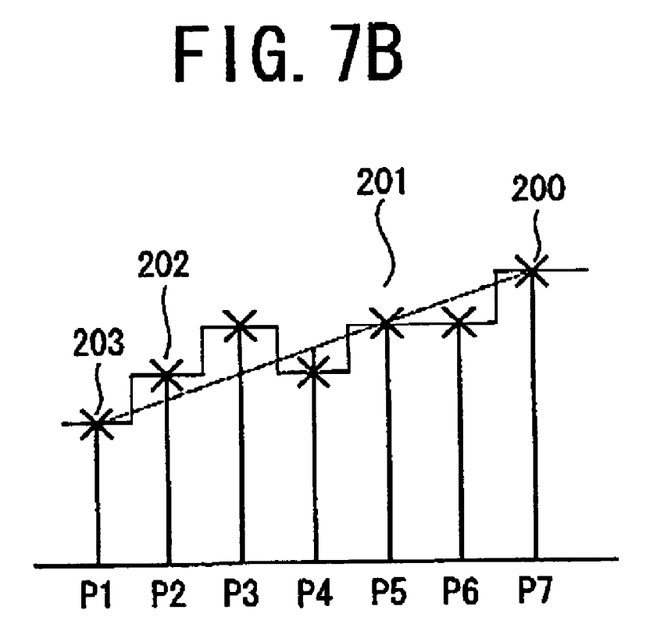
FIG. 7B is a model view showing an example of the error diffusion.

FIG. 7B shows an example of the error diffusion. FIG. 7A shows the state before error diffusion. In these drawings, 200, 201, 202 and 203 respectively denote the first representative color, the first interpolated color, the second interpolated color and the second representative color. P1–P7 denote the pixels. For example, when 200 and 201 are red and 202 and 203 are white, it is possible to express pink color by mixing the red and white pixels as shown in FIG. 7B. The straight line connecting 200 and 203 in the drawings is the straight line for linear interpolation.

Figure 8A:
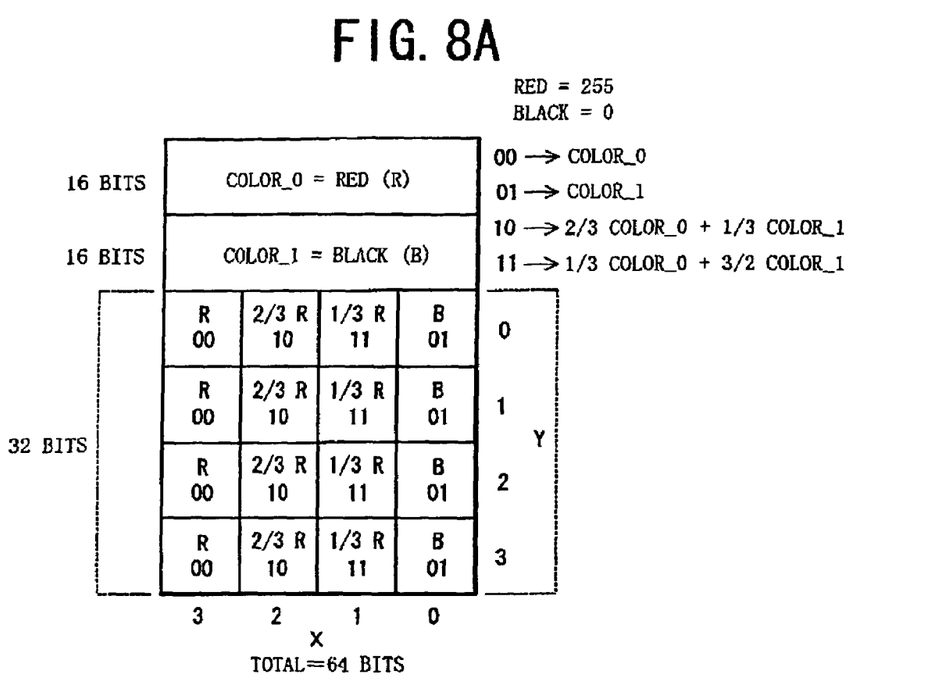
FIG. 8A is a model view showing the state before error diffusion.
Figure 8B:
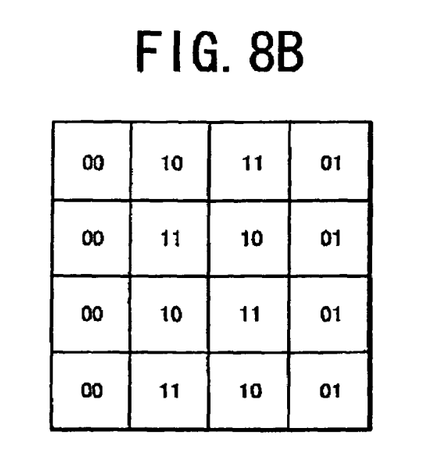
FIG. 8B is a model view showing another example of the error diffusion.

FIG. 8B shows another example of the error diffusion. FIG. 8A shows the state before error diffusion. In FIG. 8B, the reference information of pixel (2,2) is exchanged with the reference information of pixel (2,1), and the reference information of pixel (1,3) is exchanged with the reference information of pixel (2,3). As result, there is a color mixture in the central row of the block. In other words, the two middle rows of reference information are in a staggered arrangement.

Figure 9A:
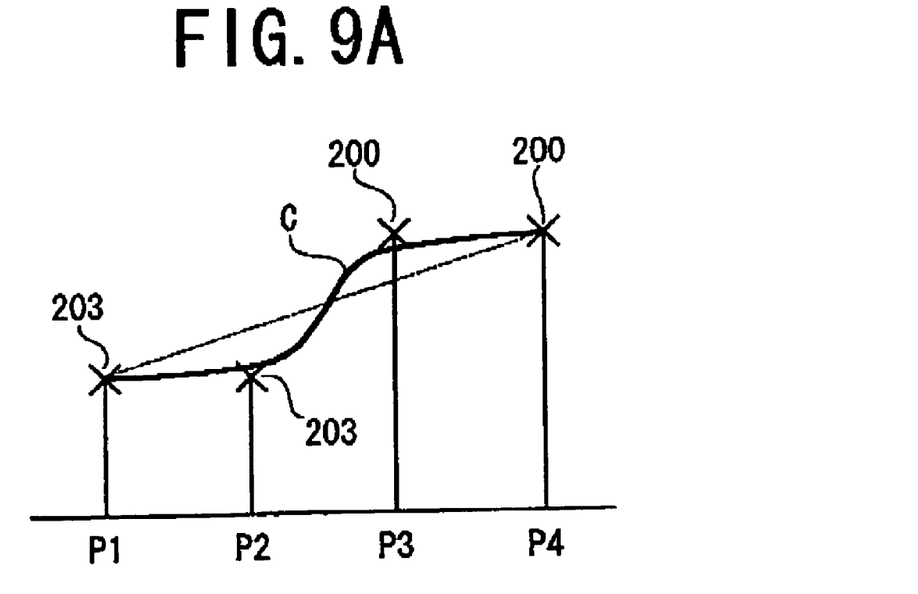
FIG. 9A is a model view showing the state before error diffusion.
Figure 9B:
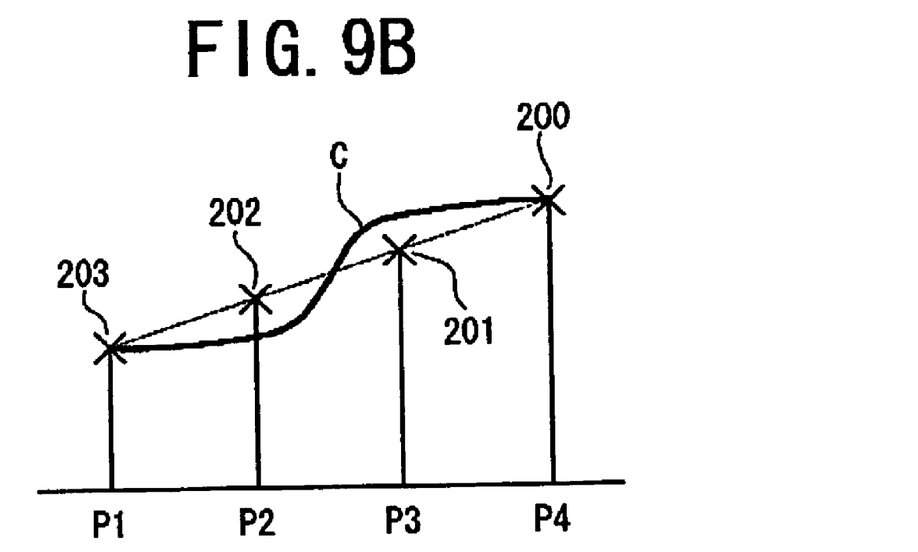
FIG. 9B is a model view showing another example of the error diffusion.

FIG. 9B shows another example of the error diffusion. FIG. 9A shows the state before error diffusion. In the drawings, curved line C shows the color before encoding. In FIG. 9A, pixels P2 and P3 reference second representative color 203 and first representative color 200, respectively. The results shown in FIG. 9A are correct in that the error between the original curve C and the color after encoding are held at a minimum. However, as interpolated colors 201 and 202 are not used in FIG. 9A, the gradation result in the block after encoding is not good. Therefore, in pixel P2 in FIG. 9B, if the error between original curve C and representative color 203 is approximately the same as the error between the original curve and interpolated color 202, it is better to select interpolated color 202. The same applies to pixel P3. To be more accurate, the reference information is first prepared to hold the error between the original curve C and the color after encoding at a minimum, but if, as a result, the interpolated colors are not used at all, the reference information is prepared in a way that, even when the error between original curve C and the interpolated color is larger that that between the original curve and the representative color, as long as the error of the interpolated color is equal to or smaller than a predetermined threshold value, the interpolated color is referenced.

Figure 10:
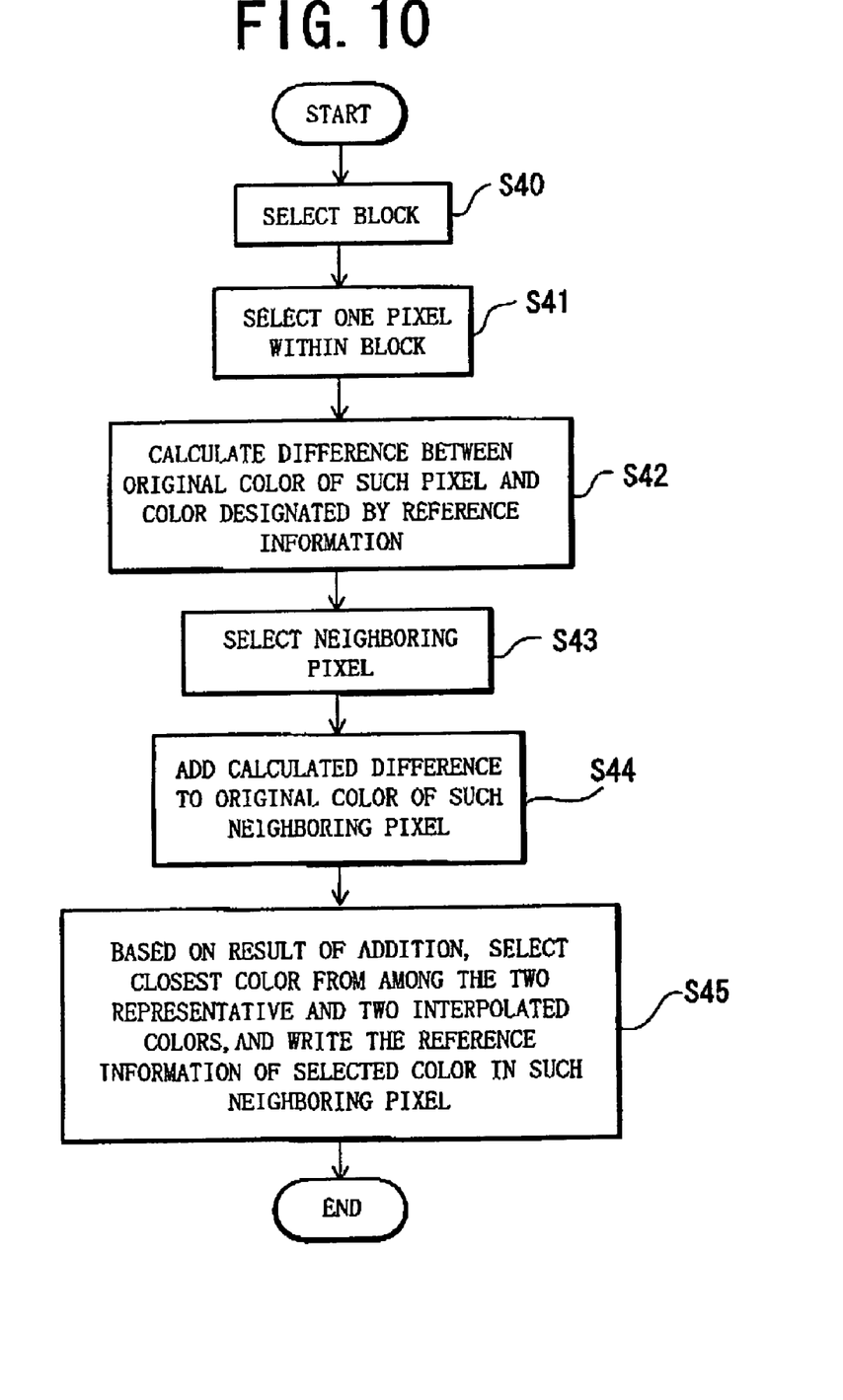
FIG. 10 is a flowchart showing the error diffusion processing that references information on the surrounding color.

Preferably, information on the surrounding color is referenced during the error diffusion arrangement. A concrete example is shown in FIG. 10.

S40: A block is selected.

S41: One point (pixel) within the block is selected.

S42: The difference between the original color that the original image had for this pixel and the color designated by the reference information is calculated. This difference is used to process the next (neighboring) pixel. Reference information referencing one of the two representative and two interpolated colors is written in advance in such pixel.

S43: A neighboring pixel is selected.

S44: The calculated difference is added to the original color of such neighboring pixel.

S45: The color that is closest to the color resulting from S44 is selected from among the two representative and two interpolated colors, and the reference information of the selected color is written in such pixel.

According to the processing described above, when a color that is darker than the original color is selected during the encoding, the difference (the shortage because the color is darker than the original color) is added to the original color of the next (neighboring) pixel (the color becomes brighter than the original color), and the resulting color is then compared with the two representative and two interpolated colors. In other words, if a dark color is selected, a bias is set to select a bright color in the next processing. On the other hand, if a color that is brighter than the original color is selected during the encoding, the difference incurred thereby (the excess because the color is brighter than the original color) is subtracted from the original color of the next (neighboring) pixel (the color becomes darker than the original color), and the resulting color is then compared with the two representative and two interpolated colors. In other words, if a bright color is selected, a bias is set to select a dark color in the next processing.

The present invention is not limited to the above embodiments; possible variations within the scope of the claims are covered by the claims.

What is claimed is:

1. A method for generating an image that is encoded in block units from an original image, comprising:

an image decomposing step for dividing said original image in plural blocks containing plural pixels, respectively;

block encoding step for deciding at least two representative colors for each of said blocks and generating reference information of each pixel within said block; and an editing step for editing said representative colors and/or said reference information of said block, the editing step including selecting one of the blocks, selecting at least one of said representative colors of the selected block, and changing the at least one selected representative color based on external instructions;

wherein said reference information is information designating either one of said representative colors, or an interpolated color calculated from said representative colors, as the color of said pixel.

2. The method for image compression in block units according to claim 1, wherein said editing step comprises the steps of:

selecting one of said blocks;

selecting at least a portion of said reference information of the selected block; and changing the selected reference information based on external instructions.

3. The method for image compression in block units according to claim 1, wherein said editing step comprises the steps of:

selecting one of said blocks; and re-encoding the selected block by referencing parameters relating to the difference in display properties of a television receiver that is the display device of a game machine, and the monitor of a personal computer.

4. The method for image compression in block units according to claim 3, wherein said parameters include a brightness parameter set in a way to suppress the brightness, a gamma parameter set corresponding to the gamma properties of the television receiver of a game machine and the monitor of a personal computer, and a chroma parameter set corresponding to the chroma properties of the television receiver of a game machine and the monitor of a personal computer.

5. The method for image compression in block units according to claim 1, wherein said editing step comprises a step of exchanging reference information between neighboring pixels, and wherein a color that does not correspond to any of said representative colors or said interpolated colors is expressed.

6. The method for image compression in block units according to claim 1, wherein said editing step comprises the step of, when the error between the original color and the closest representative color and the error between the original color and the closest interpolated color are approximately the same, said interpolated color is selected.

7. The method for image compression in block units according to claim 1, wherein said editing step comprises the steps of:

selecting one of said blocks;

selecting one pixel within the selected block;

calculating the difference between the original color of such pixel and the color designated by said reference information;

selecting a pixel neighboring said pixel;

adding said difference to the original color of such neighboring pixel, selecting the color closest the resulting color from among said representative color and interpolated color calculated from said representative color, and writing the reference information of the selected color in such neighboring pixel, wherein information on the surrounding color is referenced during the error diffusion arrangement.

8. An apparatus for generating an image that is encoded in block units from an original image, comprising:

an image decomposer for dividing said original image in plural blocks containing plural pixels, respectively;

a block encoder for deciding at least two representative colors for each of said blocks and generating reference information of each pixel within said block; and an editor for editing said representative colors and/or said reference information of said block said editor including an image editor that selects one of the blocks, selects at least one of said representative colors of the selected block, and changes the at least one selected representative color based on external instructions, wherein said reference information is information designating either one of said representative colors, or an interpolated color calculated from said representative color as the color of said pixel.

9. The apparatus for image compression in block units according to claim 8, wherein said editor comprises an image editor that selects one of said blocks, selects a portion or all of said reference information of the selected block, and changes the selected reference information based on external instructions.

10. The apparatus for image compression in block units according to claim 8, wherein said editor comprises a color equalizer that selects one of said blocks, and re-encodes the selected block by referencing parameters relating to the difference in display properties of a television receiver that is the display device of a game machine, and the monitor of a personal computer.

11. The apparatus for image compression in block units according to claim 10, wherein said parameters include a brightness parameter set in a way to suppress the brightness, a gamma parameter set corresponding to the gamma properties of the television receiver of a game machine and the monitor of a personal computer, and a chroma parameter set corresponding to the chroma properties of the television receiver of a game machine and the monitor of a personal computer.

12. The apparatus for image compression in block units according to claim 8, wherein said editor comprises an error diffuser that exchanges reference information between neighboring pixels, and wherein a color that does not correspond to any of said representative colors or said interpolated colors is expressed.

13. The apparatus for image compression in block units according to claim 8, wherein said editor comprises an error diffuser that, when the error between the original color and the closest representative color and the error between the original color and the closest interpolated color are approximately the same, selects said interpolated color.

14. The apparatus for image compression in block units according to claim 8, wherein said editor comprises an error diffuser that selects one of said blocks, selects one pixel within the selected block, calculates the difference between the original color of such pixel and the color designated by said reference information, selects a pixel neighboring said pixel, adds said difference to the original color of such neighboring pixel, selects the color closest the resulting color from among said representative color and interpolated color calculated from said representative color, and writes the reference information of the selected color in such neighboring pixel, wherein information on the surrounding color is referenced during the error diffusion arrangement.

15. A computer-readable medium storing a program for causing a computer to generate an image that is encoded in block units from an original image, said program comprising:

an image decomposing step for dividing said original image in plural blocks containing plural pixels, respectively;

a block encoding step for deciding at least two representative colors for each of said blocks and generating reference information of each pixel within said block; and an editing step for editing said representative color and/or said reference information of said block, the editing step including selecting one of the blocks, selecting at least one of said representative color of said block, and changing at least one selected representative color based in external instructions;

wherein said reference information is information designating either one of said representative colors, or an interpolated color calculated from said representative colors, as the color of said pixel.

* * * * *